United States Patent
Rosenhahn et al.

(10) Patent No.: US 6,485,168 B2
(45) Date of Patent: *Nov. 26, 2002

(54) HEADLIGHT DEVICE FOR VEHICLE

(75) Inventors: Ernst-Olaf Rosenhahn, Bodelshausen (DE); Michael Hamm, Pfullingen (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/535,225

(22) Filed: Mar. 27, 2000

(65) Prior Publication Data

US 2002/0114165 A1 Aug. 22, 2002

(30) Foreign Application Priority Data

Mar. 30, 1999 (DE) .......................... 199 14 417

(51) Int. Cl.[7] ................................. B60Q 1/06
(52) U.S. Cl. .................. 362/465; 362/523; 362/466; 362/467; 362/513; 362/514
(58) Field of Search ................. 362/465, 466, 362/467, 539, 523, 526, 531, 532, 512, 514, 513, 525

(56) References Cited

U.S. PATENT DOCUMENTS

| 1,277,518 A | * | 9/1918 | Winston ............. 362/286 |
| 5,469,340 A | * | 11/1995 | Heizmann ........... 362/418 |
| 5,499,168 A | * | 3/1996 | Cochard et al. ......... 362/276 |
| 5,567,032 A | * | 10/1996 | Heizmann ........... 362/277 |
| 5,673,990 A | * | 10/1997 | Neumann et al. ....... 362/351 |
| 6,144,159 A | * | 11/2000 | Lopez et al. .......... 315/82 |

FOREIGN PATENT DOCUMENTS

DE     197 29 826 A1     1/1999

* cited by examiner

*Primary Examiner*—Thomas M. Sember
(74) *Attorney, Agent, or Firm*—Michael J. Striker

(57) ABSTRACT

A headlight device for a vehicle has at least two headlights, each emitting a screened light beam with an upper bright-dark limit, which on a counter traffic side and on a traffic side has different portions. A portion on the counter traffic side is arranged deeper in a vertical direction than a portion on the traffic side, and the portion on the traffic side extends so as to ascend starting from the portion on the counter traffic side over a part of the extension of the portion on the traffic side. The headlights are formed so that the light bundles are emitted with different bright-dark limits. At least one headlight emits a first light bundle with a bright-dark limit, with the portion which on the traffic side is located higher in a vertical direction than the portion of the bright-dark limit at the traffic side of a second light bundle emitted by at least one second headlight. A direction of the second light bundle is changeable so that a position of its bright-dark limit is changed at least in a vertical direction.

16 Claims, 3 Drawing Sheets

HEADLIGHT DEVICE FOR VEHICLE

The present invention relates to a headlight device for a vehicle.

Headlight devices are known in the art. One of such devices is disclosed for example in the German patent document DE 197 29 826. This headlight device has at least two headlights, with which correspondingly a screen light bundle with an upper bright-dark limit is emitted. The light bundle emitted by both headlights are identical and their bright-dark limits have different portions on the traffic side and on the counter traffic side. The portion of the bright-dark limit arranged on the counter traffic side is deeper than the portion arranged at the traffic side. The portion of the bright-dark limit arranged at the traffic side extends starting from its portion on the counter traffic side at least over a part of its extension in a raising manner. Because of this course of the bright-dark limit a sufficient range of the light bundle emitted by the headlight at the traffic side is provided with simultaneous prevention of a blinding of the opposite traffic. For producing the high beam, in this headlight device separate high beam headlight is connected and light bundles emitted by both above mentioned headlights are lifted so that by then also the far region in front of the vehicle is illuminated. During driving with high speed on speed way, due to the lifting of the light bundle provided by the known headlight device, also an improved illumination of the far region in front of the vehicle is obtained, wherein due to the absent counter traffic it is not blinded. However, the problem occurs that the forwardly driving vehicle driver is unpermissibly intensely blinded by the light reflected by its rear mirror and emitted by the headlight of the rearwardly driving vehicle.

SUMMARY OF THE INVENTION

Accordingly, it is an object of the present invention to provide a headlight device of the above mentioned general type which avoids the disadvantages of the prior art.

In keeping with these objects and with others which will become apparent hereinafter, one feature of present invention resides, briefly stated, in a headlight device in which light beams with different bright-dark limits are emitted by at least two headlights, a first light beam emitted by at least one first headlight is provided with a bright-dark limit having a portion on a traffic side which is higher than the portion of the bright-dark limit at the traffic side of the second light bundle emitted by at least one second headlight, and a direction of the second light beam is changeable so that the position of its bright-dark limit is changeable at least in a vertical direction.

When the headlight device is designed in accordance with the present invention, then with the low beam light for improving the illumination of the far region in front of the vehicle, the second light beam can be lifted, and by the arrangement of the portion of the bright-dark limit of the second light beam at the traffic side no unacceptable blinding of the forwardly driving traffic occurs.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
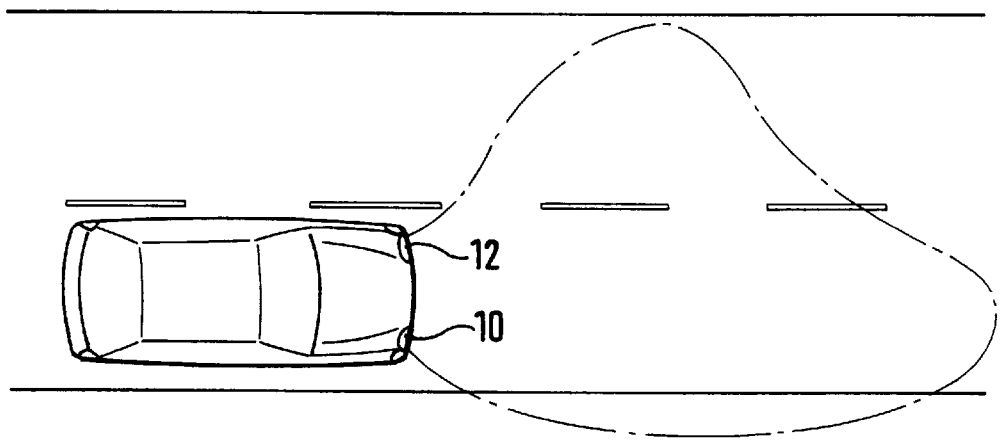
FIG. 1 is a view showing a vehicle with a headlight device.

A vehicle shown in FIG. 1, in particular a motor vehicle, has a headlight device which includes at least two headlights 10 and 12. They are arranged in a known manner on the front side of the vehicle close to the lateral edges of the vehicle. The headlights 10 and 12 can have several headlight units which emit the light bundles with different characteristics. Subsequently, both headlights 10, 12 are referred to, while also each individual headlight unit of the headlights 10, 12 can be meant, when the headlights 10, 12 are subdivided into several headlight units. The vehicle is provided for the use with right side traffic, so that the traffic side is located at the right side of the vehicle and the counter traffic side is located at the left side of the vehicle.

Figure 2:
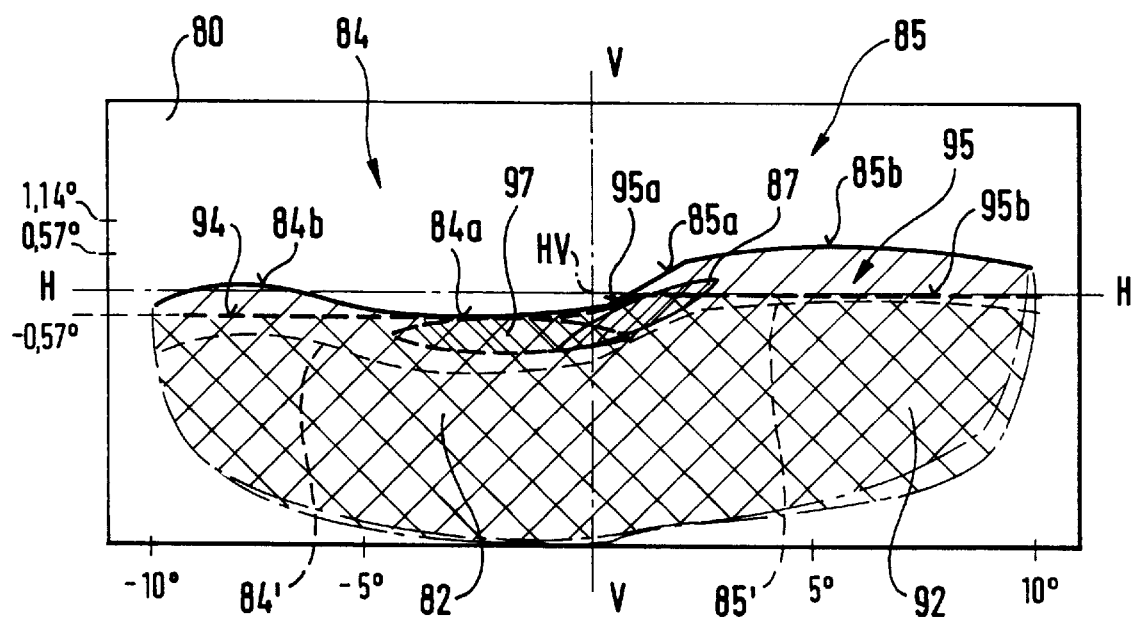
FIG. 2 is a view showing a measuring screen which is arranged in front of the vehicle and illuminated by a first light beam emitted by the headlights of the headlight device in a first position.

Both headlights 10, 12 are designed so that they emit different screened light bundles each having an upper bright-dark limit. In FIGS. 2 and 3a measuring screen 80 arranged at a distance in front of the vehicle is shown. It is illuminated by the light bundles emitted by the headlights 10, 12. The horizontal central plane of the measuring screen 80 is identified as HH and its vertical central plane is identified with VV. The horizontal central plane HH and the vertical plane VV intersect in a point HV. A horizontal connecting line between the headlights 10,12 and the measuring screen 80 intersects the measuring screen 80 in the point HV.

The headlight 10 arranged in the right side of the vehicle is designed so that it emits a first light bundle which illuminates the measuring screen 80 in a first region 82. The region 82 is limited from above by a bright-dark limit, which at the right side of the measuring screen 80 or on the traffic side and at the left side of the measuring screen 80 or on the counter traffic side has different portions. The portion 84 on the counter traffic side extends in a partial portion 84 left at the vertical central plane VV first at least approximately horizontally and substantially 1%, correspondingly 0.57°, under the horizontal central plane HH. At the left edge of the measuring screen 80 the partial portion 84b adjoining the partial portion 84a, extends the portion 84 of the bright-dark limit first ascendingly and then again descendingly, and the course between the ascend and descend is continuously curved or buckled. The portion 84 in its partial portion 84b can extend up to the height of the horizontal central plane HH or substantially over it. The horizontal partial portion 84a of the portion 84 of the bright-dark limit can extend up to 5° left of the vertical central plane VV.

The portion 85 of the bright-dark limit of the region 82 at the traffic side extends from the partial portion 84a of the portion 84 in a partial portion 85a to the right ascendingly at an angle α, and the ascend angle α is approximately from 10° to 50°. The ascending partial portion 85a of the portion 85 extends up to substantially 1–2%, correspondingly substantially 0.57–1.14°, above the horizontal central plane HH and up to substantially 2–3° right of the vertical central plane VV. At the ascending partial portion 85a of the portion 85, a partial portion 85b extends with smaller ascend or substantially horizontal course. The partial portion 85b can be curved substantially upwardly, so that it first somewhat ascends and subsequently descends. The partial portion 85b can have its highest position for example at substantially 4–7° right of the vertical central plane VV.

The light bundle emitted in the region 82 by the headlight 10 has a predetermined distribution of the illumination intensity. In a zone 87 of the region 82, which is arranged substantially right of the vertical central plane VV and closely under the bright-dark limit, the highest illumination intensity is provided. The zone 87 can extend substantially left beyond the vertical central plane VV and is preferably located close under the raising partial portion 85a of the portion 85 of the bright-dark limit.

The headlight 12 arranged at the left side of the vehicle is formed so that a second light beam emitted by it illuminates the measuring screen 80 in accordance with FIG. 2 in a second region 92. The region 92 is limited from above by a bright-dark limit which at the right side of the measuring screen 80 which is a traffic side and at the left side of the measuring screen 80 which is a counter traffic side has different portions. The portion 95 at the counter traffic side extends at least approximately horizontally and substantially 1%, correspondingly 0.57°, under the horizontal central plane HH. The portion 94 extends therefore at least approximately at the same height as the partial portion 84a of the portion 84 of the bright-dark limit of the region 82.

The portion 95 of the bright-dark limit of the region 92 at the traffic side extends starting from the portion 94 in a partial portion 95a to the right and ascends, while the ascend angle is substantially equal to the angle α of the ascend of the partial portion 85a of the portion 85. The ascending partial portion 95a of the portion 95 extends substantially to the height of the horizontal central plane HH and ascends therefore less high than the partial portion 85a of the portion 85. The ascending partial portion 95a extends substantially 1–2° right of the vertical central plane VV. At the ascending partial portion 95, a partial portion 95b extends, which is substantially horizontal and at least approximately extends to the height of the horizontal central plane HH.

The light bundle emitted in the region 92 by the headlight 12 has a predetermined distribution of the illumination intensity. In a zone 97 of the region 92 which are arranged substantially left of the vertical central plane VV and closely under the bright-dark limit, the highest illumination intensity is provided. The zone 97 can be arranged substantially right beyond the vertical central plane VV and is preferably closely located under the portion 94 of the bright-dark limit. The regions 82, 92 illuminated by the light bundles of the headlights 10, 12 overlap over great parts, and they are different in regard to the bright-dark limits and in regard of the position of the zone 87, 97 with the highest illumination intensity as explained herein above. The light bundles emitted by both headlights 10, 12 illuminate the measuring screen 80 in a region which corresponds to the overlapping of the both regions 82 and 92. It is limited from above by the greatest part of the higher allocated portions 84, 85 of the bright-dark limits of the region 82, and is provided in the zones 87 and 97 right and left of the vertical central planes VV of the highest illumination intensity.

The association of the regions 82 and 92 to the headlights 10 and 12 can be opposite to the one described above. In other words the light beam emitted by the right headlight 10 can illuminate the region 92 and the light beam emitted by the left headlight 12 can illuminate the region 92. When the headlight device is used for left traffic, the portions 84, 85 or 94, 95 of the bright-dark limit are exchanged with respect to the vertical central plane VV.

The position of the regions 82, 92 shown in FIG. 2 with the associated bright-dark limits makes possible an adjustment of the light bundles for low beam emitted by the headlights 10, 12, to prevent a blinding of the counter traffic. At the counter traffic side the regions 82, 92 at the location where the traffic on the roadway is located, have the horizontal partial portion 84a or the horizontal portion 94. The higher located partial portion 84b of the bright-dark limit of the region 82 is arranged above the roadway of the counter traffic, so that no blinding can be caused by it. Due to the high located partial portion 84b of the bright-dark limit of the region 82, a sufficient illumination at the counter traffic side near the roadway in a farther region is obtained, which is especially advantageous during driving on land roads. Due to the partial portion 85a which raises over the horizontal central plane HH and the partial portion 85b of the bright-dark limit of the region 82 extending above the horizontal central plane HH, a sufficient illumination of the far region at the traffic side in front of the vehicle is provided.

When the vehicle travels for example on a speedway which has no direct counter traffic, it is advantageous to illuminate the far region in front of the vehicle intensely, to improve the orientation of the vehicle driver. It is therefore provided that the second light bundle emitted by the headlight 12 which illuminates the region 92 of the measuring screen 80 of FIG. 2, can be raised. For this purpose the total headlight 12 or only a part of the headlight 12 can be adjustable so that the light bundle emitted by it can be lifted. The adjustment of the headlight 12 or the part of the headlight 12 can be performed in particular by an adjustment device which is used for a light regulation of a light range regulation of the headlight device, by which the light range of the light beam emitted by the headlight 12 can be maintained constant, regardless of the inclination of the vehicle.

Figure 3:
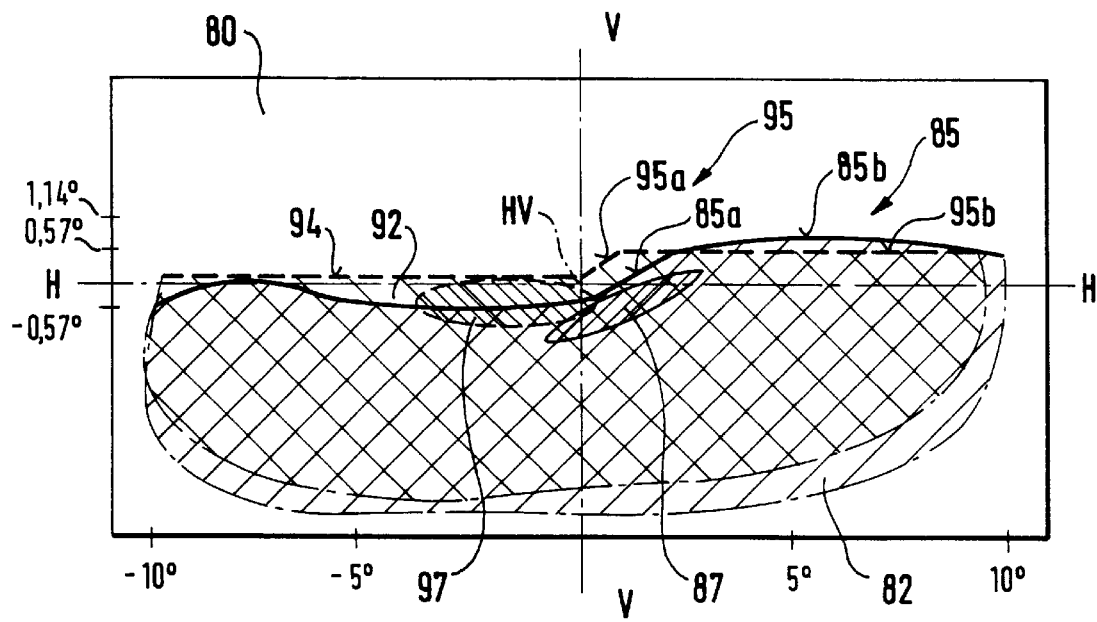
FIG. 3 is a view showing the measuring screen illuminated by a light beam emitted by the headlights of the headlight device in a second position.

FIG. 3 shows a measuring screen 80 illuminated by the light beam emitted by the headlights 10, 12 in an adjustment for speedway drive. The adjustment of the headlight 10 and thereby the light beam which is emitted by it is unchanged relative to the adjustment for low beam, so that by the light beam the region 82 of the measuring screen 80 is illuminated in the same position as in FIG. 2. The headlight 12 and thereby the light beam emitted by it is lifted so that the region 92 of the measuring screen 80 which is illuminated by it as shown in FIG. 3 is lifted upwardly with respect to its position in FIG. 2. The portion 94 of the bright-dark limit of the region 92 at the counter traffic side extends substantially at the height of the horizontal central plane HH or substantially under it, the partial portion 95b at the traffic side extends substantially 1%, correspondingly substantially 0.57° above the horizontal central plane HH. With this adjustment of the headlight 12 thereby a more intense illumination of the far region in front of the vehicle is obtained, without lifting the bright-dark limit at the traffic side over the partial portion 85b of the bright-dark limit of the light emitted by the headlight 10 which illuminates the region 82.

The change of the adjustment of the headlight 12 and thereby the light beam emitted by it can be performed manually by a vehicle driver when he drives on a speedway.

Alternatively, the change of the adjustment can be performed automatically depending on the speed. Here a change can be performed between the adjustments for the illumination in accordance with FIGS. 2 and 3 or in one or several stages or continuously between these adjustments. The light bundle can be lifted increasingly with increasing speed. In addition to the above described embodiment of the headlight device, it can be provided also that the headlight 10 or at least a part of it is adjustable so that the light beam emitted by it can be lowered starting from the adjustment for illumination of the region 82 in accordance with FIG. 2. The lowering can be performed for example so that the partial portion 85b of the bright-dark limit at the traffic side extends substantially at the height of the horizontal central plane HH. Such a lowering of the light beam can be advantageous for example during street traffic or at low speeds, since then the near region in front of the vehicle is illuminated stronger and more intense, and no intense illumination of the far region is required. With a lowering of the light beam also a reduction of blinding of another participant of the traffic is provided. A lowering of the light beam can be advantageous when the vehicle is operated in a country with a different traffic type than the traffic type for which the headlight device is initially designed, and thereby the traffic side and the counter traffic side are exchanged. The above described embodiment of the headlight device is provided for right traffic, and during its use in left traffic, the portion 84 of the bright-dark limit is arranged at the right side of the measuring screen 80 on the counter traffic side and thereby its arrangement in FIG. 2 is too high, so that a blinding of the counter traffic can occur. With lowering of the light beam emitted by the headlight 10 so that the partial portion 85b extends from its bright-dark limit at the height oft he horizontal central plane HH or under it, the blinding of the counter traffic with a left traffic is reduced or completely eliminated.

Figure 4:
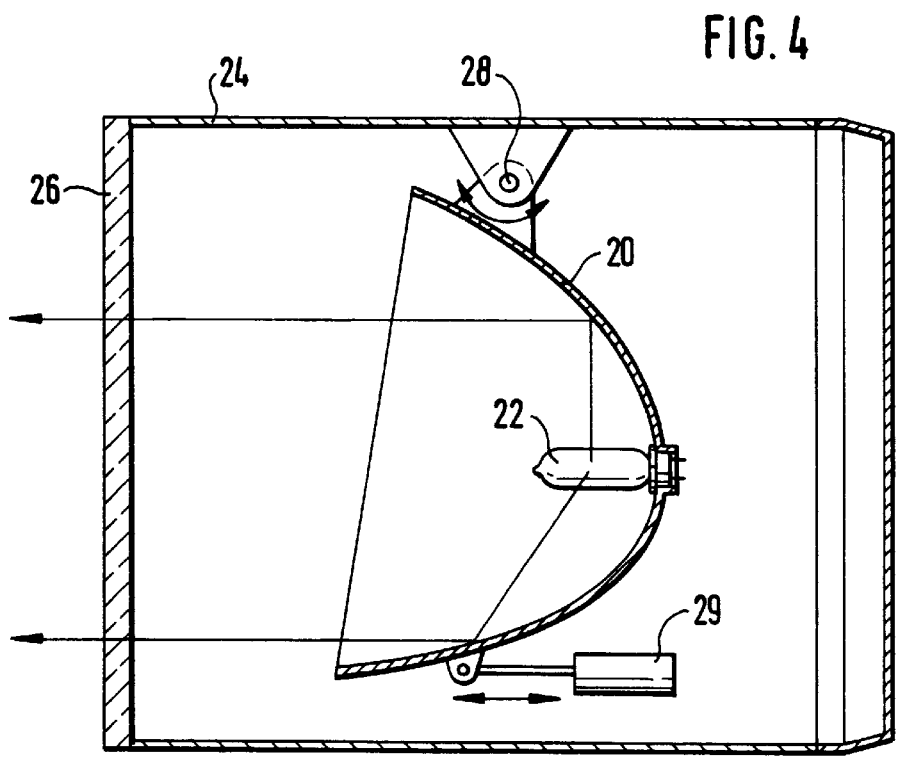
FIG. 4 is a view showing a headlight of the headlight device in accordance with a first embodiment of the present invention.

The headlights 10, 12 of the headlight device can have any construction. In FIG. 4 a first embodiment of the headlights 10, 12 is shown, which operate in accordance with a reflection principle. The headlights 10, 12 have each a reflector 20 in which a light source 22 in form of an incandescent lamp or a gas discharge lamp is inserted. Reflector 20 is arranged and a housing 24 formed so that its light outlet opening is covered with a light permeable member or disk 26. The reflector 20 is arranged adjustably in the housing 24 so that it is turnable about a horizontal axis 28. The shape of the reflector 20 can be calculated so that the light emitted by the light source 22 is reflected by it so that it illuminates the measuring screen 80 in the corresponding region 82 or 92 with the required bright-dark limit and the required distribution of the illumination intensity inside the regions 82 or 92. In this case the disk 26 does not have to have any optical profiles and can be substantially smooth. Alternatively, it can be provided that the disk 26 has optical profiles, with which the light reflected by the reflector 2 is deviated and/or dispersed during passage, so that the light bundle exiting the headlights 10, 12 illuminates the respective region 82 or 92 of the measuring screen 80 with the required bright-dark limit and the required distribution of the illumination intensity inside the region 82 or 92. The headlights 10, 12 can be together turnable about a horizontal axis or in particular turnable around the axis 98 as a part of the adjusting device 29 which engages the reflector 20, so as to provide the above mentioned lifting or lowering of the light bundle emitted by the headlight.

Figure 5:
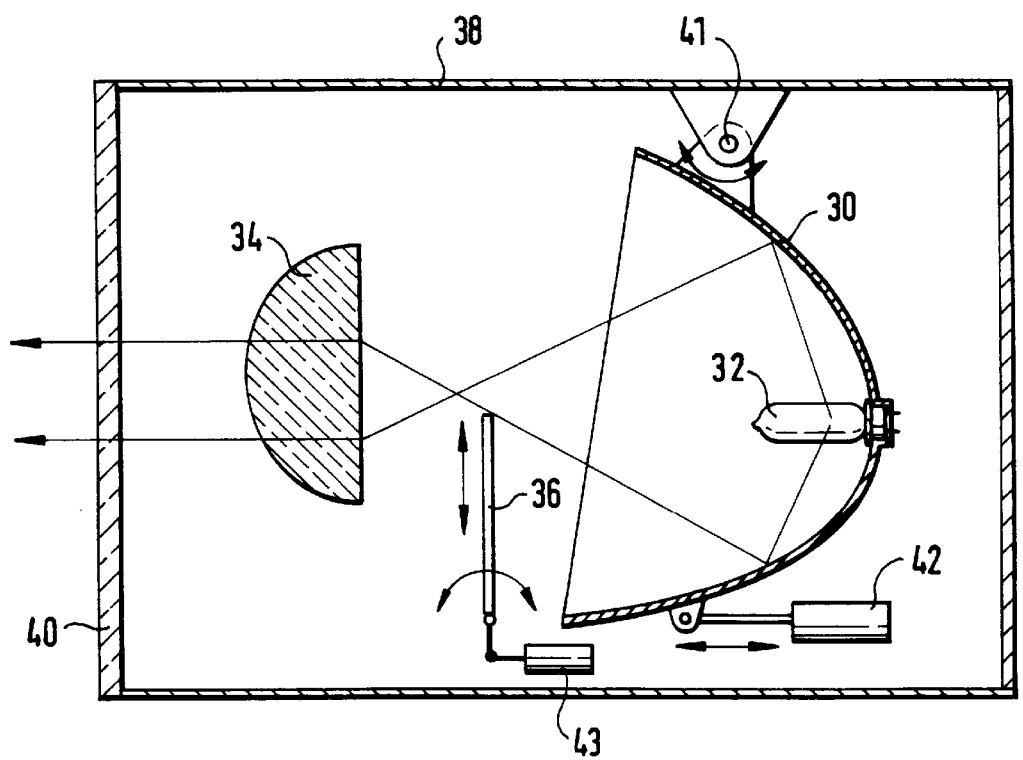
FIG. 5 is a view showing a headlight of the headlight device in accordance with the second embodiment of the invention.

The headlights 10, 12 in the second embodiment shown in FIG. 5 can be also formed in accordance with the projection principle. The headlights 10, 12 have each reflector 30, in which a light source 32 formed as an incandescent lamp or a gas discharge lamp is inserted. In the light-outlet direction after the reflector 30 a lens 34 is arranged, a screen (orifice) 36 is arranged between the lens 34 and the reflector 30. The reflector 30 with the lens 34 and the screen 36 is arranged in a housing 38, whose light outlet opening is covered by a light permeable disk 40. The reflector 30 is formed so that the light emitted by the light source 32 is reflected by it by a converging light beam. In some cases a part of the light bundle is screened by the screen 36, so that the screen 36 produces the bright-dark limit of the light bundle exiting the headlights 10,12. Alternatively the reflector 30 can be also formed so that the light bundle which is reflected by it already has a required bright-dark limit so that the screen 36 can be dispensed with.

The light bundle reflected by the reflector 30 and passing the screen 36 is collected during passage through the lens 34 and passes through the disk 40 which can be formed smooth or can be provided with optical profiles for deviating and/or dispersing the light passing through the lens 34. The light bundle exiting the headlights 10, 12 has such a characteristic that it illuminates the corresponding region 82 or 92 of the measuring screen 80 with the required bright-dark limit and inside the regions 82 and 92 produces the required distribution of the illumination intensity. In order to make possible the above mentioned lifting or lowering of the light beam emitted by the headlight, the total headlight 10, 12 can be turnable about a horizontal axis or a part of it, with the reflector 10 together with the lens 34 and the screen 36 can be turned about a horizontal axis 41 by an adjusting element 42. Alternatively, the screen 36 can be movable by means of an adjusting element 43 out of the beam path of the light beam reflected by the reflector 30 for lifting the bright-dark limit of the light bundle exiting the headlight. The screen 36 can have a changeable light permeability at least locally, so that by local switching of the screen 36 to a light-permeable position the bright-dark limit can be lifted from the light beam exiting the headlight.

It will be understood that each of the elements described above, or two or more together, may also find a useful application in other types of constructions differing from the types described above.

While the invention has been illustrated and described as embodied in headlight device for vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims: What is claimed is:

1. A headlight device for a vehicle, comprising at least two headlights each emitting a screened light beam with an upper bright-dark limit which on one counter traffic side and on a traffic side has a different portions, wherein a portion of each of the bright-dark limits of the light beams emitted by said headlights on the counter traffic side is arranged deeper in a vertical direction with respect to the vehicle than a portion on the traffic side, and the portion on the traffic side extends so as to ascend starting from the portion on the counter traffic side at least over a part of an extension of the portion on the traffic side, said headlights being formed so that light bundles are emitted with different bright-dark limits, wherein at least one first headlight emits a first light bundle with a bright-dark limit with the portion which on the traffic side is located higher in a vertical direction with respect to the vehicle than the portion of the bright-dark limit at the traffic side of a second light bundle emitted by at least one second headlight, and wherein a direction of the second light bundle is changeable so that a portion of the bright-dark limit of said second light bundle is changed at least in a vertical direction.

2. A headlight device as defined in claim 1, wherein said at least one second headlight is formed so that the bright-dark limit of said second light bundle has a portion on the counter traffic side which extends at least approximately horizontally.

3. A headlight device as defined in claim 1, wherein said headlights are formed so that the bright-dark limit of said second light bundle has a portion on the traffic side which starting from the portion of the bright-dark limit on the counter traffic side has at least one ascending partial portion and then at least one horizontal partial portion.

4. A headlight device as defined in claim 1, wherein said at least one second headlight is formed so that said second light bundle has a zone with a highest illumination intensity, wherein said zone is arranged at least substantially at the counter traffic side.

5. A headlight device as defined in claim 4, wherein said zone with highest illumination intensity is arranged closely under the portion of the bright-dark limit.

6. A headlight device as defined in claim 5, wherein said at least one first headlight is formed so that the bright-dark limit of said first light bundle on the traffic side has a portion which, starting from a portion of the bright-dark limit at the counter traffic side, has at least one first ascending partial portion and a subsequent second ascending partial portion, said second ascending partial portion ascending less than said at least one first ascending partial portion.

7. A headlight device as defined in claim 1, wherein said first headlight is formed so that the bright-dark limit of said first light bundle on the traffic side has a portion which, starting from a portion of the bright-dark limit at the counter traffic side, has at least one ascending partial portion and an approximately horizontally extending partial portion.

8. A headlight device as defined in claim 6, wherein said headlight units are formed so that a portion of the bright-dark limit of the first light bundle on the traffic side subsequent to the second ascending partial portion extends descendingly from said second ascending partial portion.

9. A headlight device as defined in claim 7, wherein said headlights are formed so that a portion of the bright-dark limit of the first light bundle on the traffic side subsequent to said approximately horizontally extending partial portion extends descendingly from said approximately horizontally extending partial portion.

10. A headlight device as defined in claim 1, wherein said headlights are formed so that said first light bundle has a zone of a highest illumination intensity which is arranged substantially on the traffic side.

11. A headlight device as defined in claim 10, wherein said zone with highest illumination intensity is arranged closely under the portion of the bright-dark limit.

12. A headlight device as defined in claim 1, wherein said at least one first headlight is formed so that the bright-dark limit of said first light bundle on the counter traffic side has an at least approximately horizontally extending portion extending over at least part of said bright-dark limit of said first light bundle.

13. A headlight device as defined in claim 12, wherein said at least approximately horizontally extending portion of the bright-dark limit of said first light bundle on the counter traffic side has at least one approximately horizontally extending partial portion and a subsequent ascending and again descending partial portion.

14. A headlight device as defined in claim 1, wherein said headlights are formed so that a portion of the bright-dark limit of the second light bundle on the counter traffic side extends in an adjustment of the second light bundle under a horizontal central plane of a measuring surface arranged in front of the headlight device, wherein the second light bundle, starting from said adjustment is liftable so that a portion of the bright-dark limit of said second light bundle arranged on the counter traffic side extends at least approximately to a height of the horizontal central plane.

15. A headlight device as defined in claim 1, wherein said headlights are formed so that a direction of said second light beam in a vertical direction is changeable depending on a speed of said vehicle, whereby at a higher speed, the bright-dark limit of said second light bundle is lifted and at a lower speed, the bright-dark limit of said second light bundle is lowered.

16. A headlight device as defined in claim 1, wherein said headlights are formed so that a direction of said first light bundle is changeable, whereby a position of the bright-dark limit of said first light bundle is changeable at least in a vertical direction.

* * * * *